(12) United States Patent
Detienne et al.

(10) Patent No.: US 7,844,719 B2
(45) Date of Patent: Nov. 30, 2010

(54) TUNNEL AVAILABILITY DETECTION WITH REDUCED CONTROL PLANE OVERHEAD

(75) Inventors: Frederic R. P. Detienne, Harze (BE); Pratima Sethi, Mumbai (IN)

(73) Assignee: Cisco Technology, Inc., San Jose, CA (US)

( * ) Notice: Subject to any disclaimer, the term of this patent is extended or adjusted under 35 U.S.C. 154(b) by 284 days.

(21) Appl. No.: 12/030,630

(22) Filed: Feb. 13, 2008

(65) Prior Publication Data

US 2008/0195733 A1 Aug. 14, 2008

Related U.S. Application Data

(60) Provisional application No. 60/901,224, filed on Feb. 13, 2007.

(51) Int. Cl.
G06F 15/16 (2006.01)
(52) U.S. Cl. .................. 709/229; 709/225; 709/238
(58) Field of Classification Search ............ 709/230, 709/238, 240, 242, 229, 225; 370/241, 217, 370/312; 726/11
See application file for complete search history.

(56) References Cited

U.S. PATENT DOCUMENTS

| 6,982,958 | B2 | 1/2006 | Iruela et al. ............... 370/236 |
| 7,362,710 | B2 | 4/2008 | Bitar et al. ............... 370/241 |
| 2003/0110276 | A1* | 6/2003 | Riddle .................... 709/230 |
| 2004/0199662 | A1* | 10/2004 | Karol et al. ............... 709/238 |
| 2005/0094567 | A1* | 5/2005 | Kannan et al. ............ 370/241 |
| 2005/0281192 | A1* | 12/2005 | Nadeau et al. ............ 370/217 |
| 2006/0168321 | A1* | 7/2006 | Eisenberg et al. .......... 709/238 |
| 2007/0157303 | A1* | 7/2007 | Pankratov ................. 726/11 |
| 2009/0161592 | A1* | 6/2009 | So ......................... 370/312 |

OTHER PUBLICATIONS

"Bidirectional Forwarding Detection," *Multiple Cisco IOS Releases*, © 2004-2007 Cisco Systems, Inc., pp. 1-50.
"ATM Cell Structures," Cisco Documentation, posted Sep. 13, 2002, © 1992-2002 Cisco Systems, Inc., http:cisco.com/univercd/cc/td/doc/product/atm/c8540/12_0/13_19/trouble/cells.htm, printed May 19, 2008, pp. 1-6.
Thomas D. Nadeau and Zafar Ali, "Bidirectional Forwarding Detection Management Information Base," draft-ietf-bfd-mib-01.txt, BFD Working Group, Jul. 2005, pp. 1-25.
D. Katz and D. Ward, "BFD for IPv4 and IPv6 (Single Hop)" draft-ietf-bfd-v4v6-1hop-02.txt, Network Working Group, Internet Draft, Mar. 2005, pp. 1-12.

* cited by examiner

*Primary Examiner*—Le Luu
(74) *Attorney, Agent, or Firm*—Campbell Stephenson LLP

(57) ABSTRACT

Network devices can detect whether a tunnel is available (e.g., usable to convey traffic in both directions) by implementing a tunnel detection protocol that uses a combination of idle timers and multiple types of probes. In this protocol, the device at one end of the tunnel is configured as an active device, while the device at the other end of the tunnel is configured as a passive device. The tunnel detection protocol is asymmetric; the active device sends probes to the passive device, but the passive device does not send probes to the active device. By using at least two types of probes, the active device can inform the passive device about the availability of the path from the passive device to the active device. Since the passive device does not need to send probes or process probe replies, control plane processing on the passive device can be reduced.

19 Claims, 5 Drawing Sheets

TUNNEL AVAILABILITY DETECTION WITH REDUCED CONTROL PLANE OVERHEAD

RELATED APPLICATION

This application claims the benefit, under 35 U.S.C. §119 (e), of U.S. Provisional Application No. 60/901,224, filed Feb. 13, 2007, entitled "Tunnel Availability Detection with Reduced Control Plane Overhead," and naming Frederic R. P. Detienne and Pratima Sethi as inventors. The above-referenced application is hereby incorporated by reference herein in its entirety as if completely and fully set forth herein.

FIELD OF THE INVENTION

This invention relates generally to networking and, more particularly, to detecting the availability of a network tunnel.

DESCRIPTION OF THE RELATED ART

Tunneling involves encapsulating a packet within another packet and sending the resulting packet over a network using a carrier protocol. The protocol used to encapsulate the original packet within another packet is called the encapsulating protocol. The encapsulated packet can be encrypted for security. Examples of encapsulating protocols include Generic Routing Encapsulation (GRE), Internet Protocol (IP) Security (IPsec), Layer 2 Tunneling Protocol (L2TP), Layer 2 Forwarding (L2F), and Point-to-Point Tunneling Protocol (PPTP).

In IPsec Virtual Private Networks (VPNs), such as Dynamic Multipoint VPM (DMVPN), Easy VPN (EzVPN), and pure IPsec, the most frequently used topology is a star or hub and spoke topology. Often, the hub is oversubscribed at various levels due to number of spokes present in the network. For example, the hub may be loaded to its maximum data plane capacity, and control plane reconvergence may be a major concern. Similarly, there is typically bandwidth over-subscription at the Internet Service Provide (ISP) link of the hub or at the cryptographic engine level.

In many situations, it is important to quickly detect whether a given tunnel is available to bidirectionally forward traffic. This involves detecting both physical and logical availability. Detecting physical interfaces problems is generally solved by the Media Access Control (MAC) layer, which can detect electrical failures of some sort and responsively notify upper layers that the interface is not usable. For example, when an Ethernet cable is not plugged in, there is no voltage on the pins and the interface is considered down at the link layer.

Detecting problems becomes more difficult in layer 2 (L2) networks. An end client may be down but a switch or hub in the middle may still be up. In this case, upper layer protocols have to figure out that the other party is not present anymore, or at least not responding. Detecting a tunnel down is similar to the latter: there is typically a layer 3 cloud between tunnel endpoints. In this case, failures are typically detected by sending probes.

There are three main sources of potential problems with typical probes: (1) probes are usually implemented using an echo mechanism, such that one side sends an echo and expects the other side to send echo reply; (2) probes are symmetrical, in the sense that both ends of the tunnel need to use probes to detect a failure at the other end; and (3) even in one-way probing mechanisms (such as Bidirectional Forwarding Detection (BFD)), each side is responsible for triggering notifications to the other side, forcing both sides to maintain control plane processing and a larger amount of state (such as timers) than necessary. In other words, the devices at each end of the tunnel need to both send probes and respond to received probes.

In a hub and spoke arrangement where tunnels are used to couple the spokes to the hub, if the hub is oversubscribed, the control plane protocols used to ensure routing information and interface availability need to be as lightweight as possible, both on the hub and on the network. Accordingly, techniques for quickly detecting tunnel availability without overly consuming hub resources are desirable. If one network device, such as a network hub, aggregates many tunnels, that network device has to process a lot of echoes (i.e., probes implemented according to an echo mechanism) in order to send the echo reply and that network device also has to generate a lot of echoes, and then process the echo replies to those echoes.

Another way to detect whether a tunnel is down involves using idle timers. If an endpoint of a tunnel is idle for too long, as identified using an idle timer, the endpoint can be declared down. The problem with this technique is that there may be idle periods in the network, in particular when the network includes remote access VPNs. If background traffic is present (e.g., such as background traffic caused by implementation of a routing protocol), detection by idle timers is as slow as the intervals in that background traffic. If the routing protocol is the background traffic, the idle timer will have to be set to, at best, 2 or 3 times the hello interval which means that the tunnel down detection mechanism will be as slow as the routing protocol to detect a failure. This is often too slow for desired performance.

BRIEF DESCRIPTION OF THE DRAWINGS

A more complete understanding of the present invention may be acquired by referring to the following description and the accompanying drawings, in which like reference numbers indicate like features.

Figure 1:
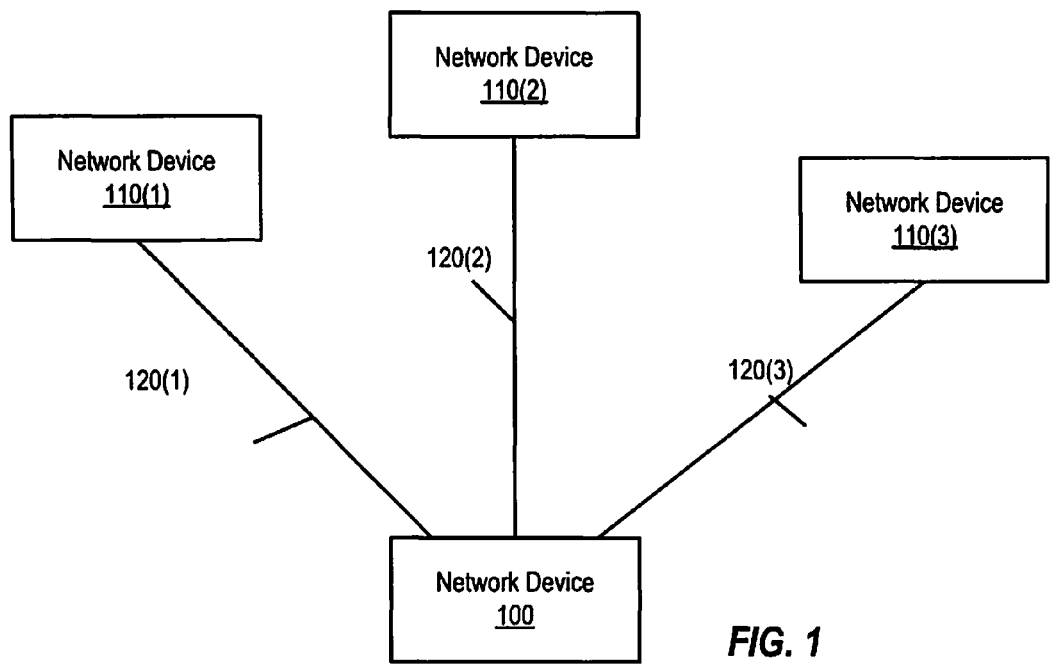
FIG. 1 shows an example of a hub and spoke network that implements a tunnel detection protocol network in which one, but not both, of the network nodes at each end of a tunnel actively send probes, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Network devices can detect whether a tunnel is available (e.g., usable to convey traffic in both directions) by implementing a tunnel detection protocol that uses a combination of idle timers and multiple types of probes. In this protocol, the device at one end of the tunnel is configured as an active device, while the device at the other end of the tunnel is configured as a passive device. The tunnel detection protocol is asymmetric; the active device sends probes to the passive device, but the passive device does not send probes to the active device. By using at least two types (also referred to herein as colors) of probes, the active device can inform the passive device about the availability of the path from the passive device to the active device. One type of probe (e.g., a "green" probe, as described in more detail below) indicates that the path from the passive device to the active device is currently available; the other type of probe (e.g., a "red" probe, as described in more detail below) indicates that the path from the passive device to the active device is currently unavailable. Since the passive device does not need to send probes or process probe replies, control plane processing on the passive device can be reduced.

FIG. 1 shows an example of a network having a hub and spoke topology. Network device 100 acts as the hub of the network, while network devices 110(1), 110(2), and 110(3) act as spokes. Network device 100 and network devices 110(1)-110(3) can be implementing using routers, switches, or other network components that are configured to support a tunneling protocol as well as a tunnel detection protocol.

Network device 100 is coupled to each spoke by a respective one of tunnels 120(1), 120(2), and 120(3). Tunnel 120(1) couples network device 110(1) to network device 100. Similarly, tunnel 120(2) couples network device 110(2) to network device 100. Tunnel 120(3) couples network device 110(3) to network device 100. Tunnels 120(1)-120(3) can be implemented using any of various remote access and tunnel concentration techniques, including Generic Routing Encapsulation (GRE), Internet Protocol (IP) Security (IPsec), Layer 2 Tunneling Protocol (L2TP), Layer 2 Forwarding (L2F), Mobile IP, Secure Socket Layer (SSL), and Point-to-Point Tunneling Protocol (PPTP), Virtual Tunnel Interface (VTI) and Dynamic VTI (DVTI). While tunnels 120(1)-120(3) are configured to implement a hub and spoke topology (also referred to as a star topology) in this example, other embodiments can use tunnels can implement a variety of other topologies (e.g., rings, meshes, and the like). In general, tunnels can be used to implement Virtual Private Networks (VPNS) of various types, including IPsec VPNs (e.g., Dynamic Multipoint VPM (DMVPN), Easy VPN (EzVPN), and pure IPsec VPNs).

In the example of FIG. 1, network devices 100 and 110(1)-110(3) implement a tunnel detection protocol in order to determine whether tunnels 120(1)-120(3) are available. In particular, network devices 100 and 110(1) use the tunnel detection protocol to detect whether tunnel 120(1) is available, network devices 100 and 110(2) use the tunnel detection protocol to detect whether tunnel 120(2) is available, and network devices 100 and 110(3) use the tunnel detection protocol to detect whether tunnel 120(3) is available.

In this example, each network device 110(1)-110(3) that is located on a spoke is configured as an "active" device with respect to the tunnel coupling each network device to network device 100. Network device 100 is configured as the "passive" device for each tunnel. Accordingly, each tunnel couples two network devices, one of which is configured as the active device (with respect to the tunnel detection protocol) and the other of which is configured as the passive device (again with respect to the tunnel detection protocol).

The tunnel detection protocol operates to determine whether each tunnel is available. A tunnel is considered to be available when probes can be sent via two paths: the path from the active device to the passive device and the path from the passive device to the active device. The active device generates probes and processes probe replies; the passive device extracts information about the status of the path from the passive device to the active device from the probes sent by the active device.

In this example, the probes are test frames emitted by a sender called the "active device" toward a receiver called the "passive device." The passive device returns the probes to the sender directly. In some embodiments, these probes are not passed up the network stack on the passive device (i.e., the receiving interface or port within the passive device does not generate an interrupt or otherwise trigger control plane processing of the probe before returning the probe to the active device) but rather are returned by the forwarding path, or data plane, of the passive device. The probes are said to be "looped back" by the passive device.

While the passive device loops back probes in many of the embodiments described herein, it is noted that other embodiments may be implemented differently. For example, in one alternative embodiment, the passive device can perform more control plane processing on a received probe before returning a probe response to the active device.

Figure 2:
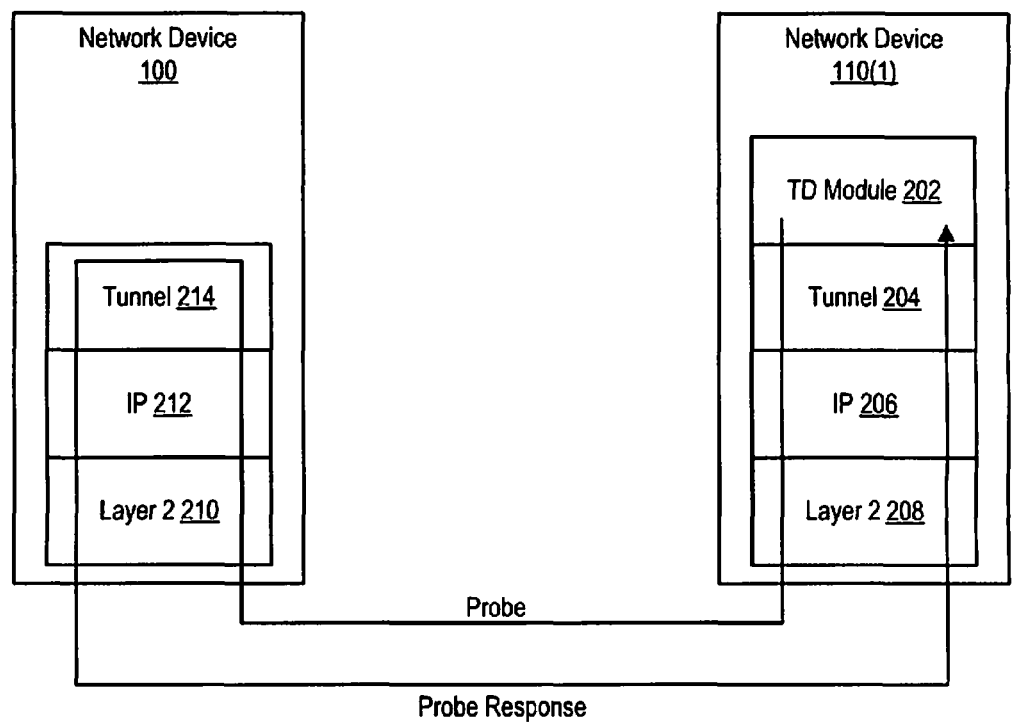
FIG. 2 is a block diagram of an active and passive network device coupled by a tunnel, according to one embodiment of the present invention.

FIG. 2 shows an example of a probe exchange between an active and passive device. As shown in FIG. 2, network device 110(1) can detect whether tunnel 120(1) (shown in FIG. 1) is available by sending a probe to network device 100. FIG. 2 illustrates the network stack of each device. As show, network device 110(1) includes a network stack that includes a tunnel detection (TD) layer module 202, a tunnel layer 204, an IP layer 206, and a layer 2 layer 208. Similarly, network device 100 has a network stack that includes layer 2 layer 210, IP layer 212, and a tunnel layer 214. Each layer can be implemented in hardware and/or software modules configured to support a particular protocol.

The probe sent by network device 110(1) can be generated by a tunnel detection (TD) layer module 202 (e.g., a software process executing in network device 110(1)), encapsulated for transmission via tunnel 120(1) by a tunnel layer 204, encapsulated with an IP header by an IP layer 206, and conveyed via a layer 2 network by a layer 2 layer 208. All or part of the tunnel and IP layers can be implemented in hardware or a combination of hardware and software.

In this example, network device 100 receives the probe via a layer 2 layer 210, removes the outer IP header (performed by IP layer 212) and tunnel header (performed by tunnel layer 214), without forwarding the probe any further up the network stack. The tunnel layer processing performed by network device 100 causes the packet to be looped back to the active device (network device 110(1) in this example) as a probe response (probe responses are probes that are looped back to the original sender), as shown in FIG. 2. The looped back packet can be re-encapsulated for transmission via the tunnel by tunnel layer 214, encapsulated with an IP header by IP layer 212, and output via a layer 2 network by layer 2 layer 210. Tunnel layer 214, IP layer 212, and layer 2 layer 210 can be implemented in hardware or a combination of hardware and software. It is noted that the loopback functionality can be incorporated into another layer (other than tunnel layer 214) in other embodiments.

By simply looping the packet back, network device 100 is able to return the probe to the sending network device 110(1)

without consuming control plane resources. In some embodiments, the loopback functionality is implemented by a forwarding engine within network device 100 (e.g., if the forwarding and routing engines are separated in network device 100, such that data plane and control plane functionality are also separated).

The probe can be sent inside the tunnel, as shown in FIG. 2 (e.g., where the probe is encapsulated for transmission via the tunnel), or via an out-of-band mechanism that relies upon and/or monitors the same transport network characteristics needed by the tunnel (e.g., in out-of-band situations, the probe may not be encapsulated for transmission via the tunnel). In other words, the mechanism used to convey the probe is such that successful receipt of the probe (from the active device to the passive device or vice versa) indicates the availability of the corresponding path within the tunnel.

Probes are used to monitor the transport network's bidirectional capabilities. When a probe is returned to the active device that emitted the probe, the active device detects that the transport network is bidirectionally operational between the active and passive device. A tunnel is operational when packets can be transported on the overlay network (e.g., "inside" the tunnel), a tunnel packet can be carried by the transport network, and packets can flow in both directions (from passive to active and from active to passive).

The probe and probe response exchange allows network devices 110(1) and 100 to detect whether the tunnel connecting those two devices is available. When a device detects that a tunnel is up (i.e., operational), that device can enter a state in which data traffic can be emitted into the tunnel by that same device. When a device detects that a tunnel is down (i.e., non-operational), that device can enter a state in which the device does not use the tunnel to send data traffic. The device may also not accept data traffic coming out of that tunnel in this state. In other words, if the tunnel is detected to be down, the device may refuse data traffic sent by the other end of the tunnel and forwarded into that tunnel. Additionally, if a tunnel is down, the device may attempt to send traffic via a backup path. The device can continue to monitor the status of the unavailable tunnel, however, such that if the unavailable tunnel becomes available at a later time, the device can begin using the tunnel instead of and/or in addition to the backup path.

It is noted that control traffic can be sent into the tunnel regardless of its status. Control traffic includes the probes described herein.

As noted above, at least two types of probes are used to detect tunnel availability. For ease of explanation, these two types of probes are described in terms of colors, and the mechanism for providing two types of probes is referred to as a coloring mechanism. The two types of probes are green probes (e.g., corresponding to a green traffic light indicating that traffic can proceed) and red probes (e.g., corresponding to a red traffic light that indicates that traffic should not proceed).

The two types of probes are distinguished by virtue of their containing different information (e.g., the "mark" described below). This information can be part of the header of the packet in some embodiments. For example, the value of a particular field within the header can indicate the type of probe. Similarly, the type of protocol used to convey the probe can indicate the type of probe (e.g., different types of probes can be conveyed using different protocols, such that if a probe is conveyed via one protocol, that probe is the first type of probe, and if a probe is conveyed via another protocol, that probe is the second type of probe). This information describes the availability of the path from the passive device to the active device.

In steady state, under operational conditions, the active device sends probes that contain a special mark (i.e., the information, such as protocol type, header value, and the like) used to differentiate between types of probes). The mark in the packet makes the probe easily identifiable by the active and passive device. Under operational conditions (i.e., when the tunnel is available, as determined by the active device), the special mark is a "green" mark. Probes containing the green mark are "green probes."

Probes of another type include a "red" mark and are called "red probes." Red probes are sent by the active device when all or part of the tunnel is not functioning (again, as determined by the active device). Red probes are mutually exclusive of the green probes, such that a given probe can be a red probe or a green probe, but not both a red and green probe.

Thus, the probe sent by network device 110(1) is either a red or green probe. The network device 100 (the passive device in this example) can be configured to extract the information from the received probe in order to determine whether the probe is a red probe or a green probe, and thus whether the tunnel is currently available or not. Network device 100 can also track whether any probes are received within a given interval (e.g., using a timer, as described below). In at least some embodiments, both of these processes can be implemented in the data plane of network device 100 in order to avoid creating additional load on the control plane.

When network device 110(1) (the active device in this example) receives a probe response (i.e., a probe that is returned to the active device by the passive device, regardless of color), network device 110(1) detects that end-to-end connectivity is available in both directions since the probe has been successfully transmitted via both paths (from the active device to the passive device and vice versa). In this situation, network device 110(1) determines that the tunnel is available and can send green probes. In some embodiments, network device 110(1) may wait to send green probes until a minimum number of probes have been successfully looped back from network device 100. Furthermore, in some embodiments, network device 110(1) (the active device) may begin operation (e.g., upon being powered up and/or in response to being configured to use the tunnel) by sending red probes to network device 100; after a certain number of probes are looped back successfully, network device 110(1) can begin sending green probes to network device 100.

If a certain number (e.g., one or more) of probes are lost, the tunnel is declared unavailable and marked down. The number of lost probes needed to trigger this state change can be prespecified (e.g., according to user-supplied configuration information entered into a network device by a network administrator). Thus, if network device 110(1) fails to receive a certain number of probes back from network device 100, network device 110(1) can begin marking subsequent probes as red probes.

As will be described in more detail below, network device 100, which is looping back probes sent by network device 110(1) and is not itself sending any probes, detects whether the tunnel is available based upon an idle timer as well as the color of the packet. Network device 100 can use an idle timer to detect whether probes are received from the active device (e.g., based upon prespecified timing criteria). If probes are not received, as determined based upon the idle timer, network device 100 detects that the tunnel is not available, based upon a lack of availability to transmit packets from the active device to the passive device. Similarly, network device 100 can extract the information identifying the color from the probe in order to determine whether the tunnel is available to transmit packets from the passive device to the active device.

Figure 3:
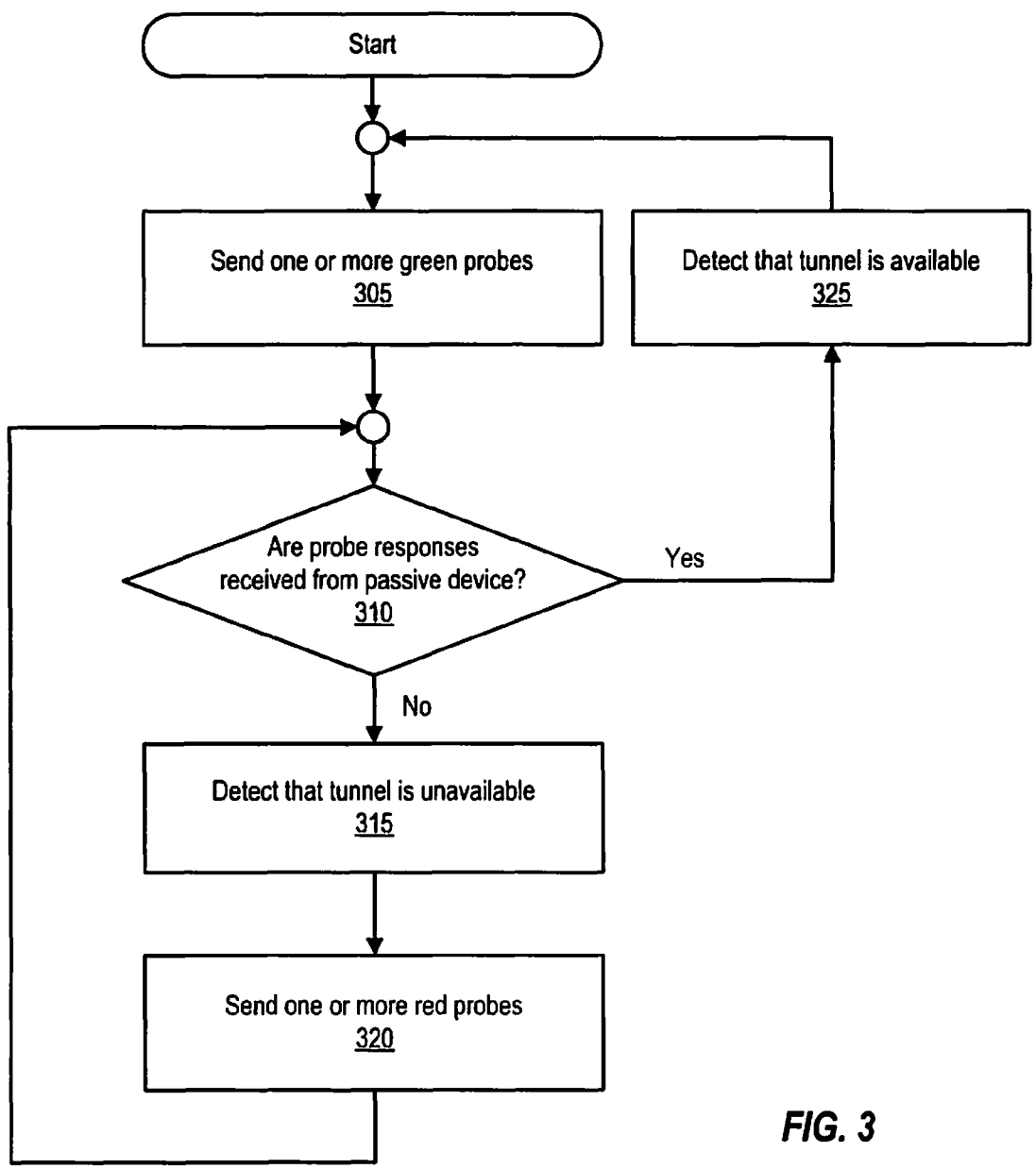
FIG. 3 is a flowchart of a method of detecting tunnel availability at an active device at one end of the tunnel, according to one embodiment of the present invention.

FIG. 3 is a flowchart of a method performed by an active device (e.g., network device 110(1) of FIG. 2). As shown at 305, the active device can send one or more green probes to the passive device. Sending these probes can involve activity in one or more of the network layers illustrated in FIG. 2. Successive probes can be sent at regularly intervals and/or in response to prespecified stimuli. Green probes are simply probes that include information usable to distinguish green probes from red probes. This presence of this "green" probe information indicates that the tunnel is available.

If the active device receives responses to each green probe (or to a prespecified percentage or number of green probes within a particular time period), the active device determines that the tunnel is available and continues to send green probes, as shown at 310 and 325. As described above, in some embodiments the probe responses can simply be looped back copies of the original probe sent by the active device, which have been processed by the data plane of the passive device and re-encapsulated for transmission back to the active device.

If responses are not received, the active device determines that the tunnel is not available and begins sending red probes, as shown at 310, 315, and 320. Red probes are simply probes that include information usable to distinguish red probes from green probes. This presence of this "red" probe information indicates that the tunnel is not currently available.

The active device can continue to routinely (e.g., periodically or in response to predetermined stimuli) determine whether the tunnel is available based upon the receipt (or lack thereof) of probe responses, as shown at 310. Accordingly, the active device can cycle from periods in which green probes are sent to periods in which red probes are sent, and vice versa.

Figure 4:
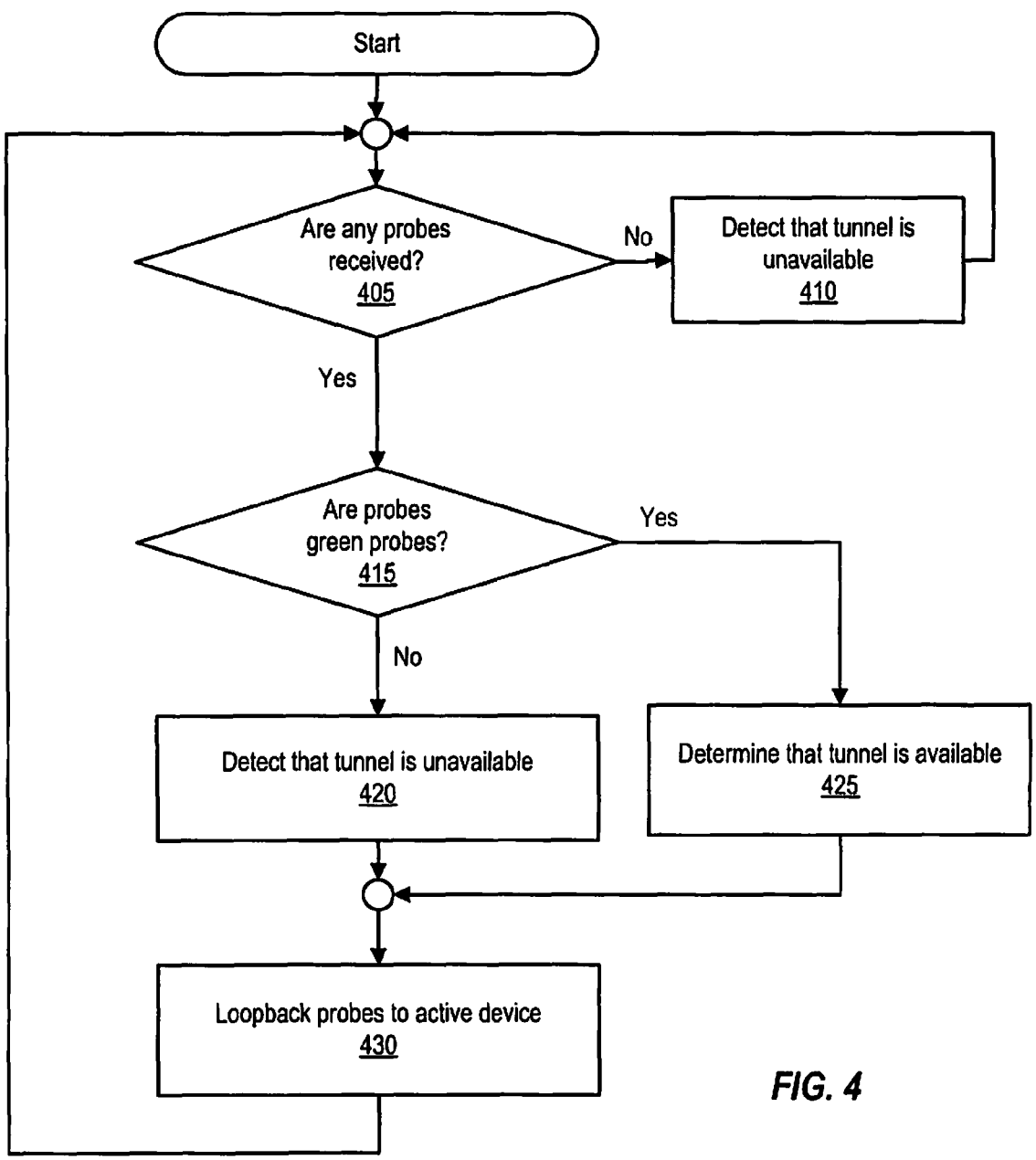
FIG. 4 is a flowchart of a method of detecting tunnel availability at a passive device at the other end of the tunnel, according to one embodiment of the present invention.

FIG. 4 is a flowchart of a method that can be performed by a passive device, such as network device 100 of FIGS. 1 and 2. In some embodiments, this method can be implemented by the data plane (e.g., in hardware and/or as part of a forwarding engine) of the passive network device.

Since only the active end of the tunnel sends probes, the passive device needs a different mechanism to detect failure on the network. As described above, the passive side can simply loop back or reflect probes (e.g., at the IP layer, as shown in FIG. 2) without actually performing control plane processing of the probes. However, the data plane of the passive device can be configured to match traffic corresponding to probes and to keep statistics (e.g., using idle timers) on the looped back probes. The passive device can thus monitor the reflection of the probes it receives and forwards back to the active device. Based on this monitoring, the passive device can detect whenever a certain amount of green probes are lost (e.g., according to an implementation-specific passive device policy configured by an administrator) and, in response, declare the tunnel down. When a passive device receives green probes in a satisfactory manner (according to the passive device policy), the passive device detects that the tunnel is up and will loop back probes normally.

In one embodiment, the passive device maintains an idle timer for each tunnel. This idle timer can, in one embodiment, be implemented as a counter that is incremented each time a probe is received within a time interval (usually a multiple of the inter-probe interval, or the time it takes a probe to travel from the active device to the passive device and then back from the passive device to the active device). The passive device checks the counter and if the counter stops increasing each time interval, the passive device declares the associated tunnel down. Alternatively, the idle timer can be implemented using linked list of sessions, as described in more detail below. This idle timer can be maintained as part of the data plane, or forwarding path, of the passive device in at least some embodiments.

In most embodiments, the passive device will continue to loop back probes when in the tunnel down state. However, in some embodiments, the passive device can stop looping back green probes (i.e., such probes can be dropped, or discarded without forwarding, when in the tunnel down state).

As shown in FIG. 4, the passive device can detect (e.g., using an idle timer) whether one or more probes (e.g., the number can be determined according to a user-supplied configuration or preconfigured in the passive device) associated with a particular tunnel have been received from the active device, as shown at 405. If a probe is received, the passive device parses the probes to determine whether the received probe is a green probe, as shown at 415. If so, the passive device determines that the tunnel is available, as indicated at 420. If the probe is a red probe, or if no probes have been received, the passive device determines that the tunnel is unavailable, as shown at 410 and 425. If any probes were received, the passive device loops those probes back to the active device, as shown at 430.

The determination at 415 can be performed by the data plane of the passive device. The data plane processing of the passive device can detect both the green probes and the red probes (e.g., based upon a "mark," or information, contained within each type of probe). For example, the receiving interface or port within the passive device can include a Ternary Content Addressable Memory (TCAM) that is configured to identify the type of packet based upon the mark contained within each probe. Based upon which type of packet is identified, the receiving port can trigger the appropriate action (e.g., updating the tunnel state and/or updating an idle timer associated with the tunnel). For example, if the TCAM identifies that a probe is a red probe, the receiving interface can transition the tunnel state from available to unavailable. If a green probe is subsequently received, the receiving interface can again transition the tunnel state from unavailable to available.

As soon as a tunnel is declared down on the active device, the active device starts sending red probes. Red probes are also looped back by the passive device. If a passive device receives red probes, the passive device should mark the tunnel down as soon as possible.

The passive device can loop the red probes back, regardless of the tunnel status. However, given that red probes indicate a network failure, at least some red probes may be lost due to that network failure.

As the above description shows, the coloring of the probes allows the passive device to identify whether the tunnel is available to send data packets from the passive device to the active device. Thus, even though the passive device does not receive probe responses from the active device, the passive device can still detect that the tunnel is down when there is a failure in the data path from the passive device to the active device. Similarly, the passive device can use an idle timer to detect whether there is a failure in the data path from the active device to the passive device.

As soon as an active device receives one or more red probes (e.g., the number can be preconfigured or user-supplied), the active device determines that the return path is up again. Accordingly, the active device can determine that the tunnel is up and begin emitting green probes. When a passive device receives green probes again (e.g., in a satisfactory manner according to its passive device policy), the passive device also determines that the tunnel is back up.

Thus, in the above-described protocol, only the active device sends probes. The passive device simply loops the probes back to the active device and uses the information within the probes (or the lack of probes, as detecting using a timer associated with the tunnel) to determine whether the tunnel is currently capable of conveying traffic from the passive device to the active device.

The coloring mechanism (i.e., the use of multiple different types, or "colors," of probes) allows both the active and passive device to be able to identify whether the tunnel is available, despite the fact that only the active device is sending probes. Since the passive device does not need to send probes, the passive device only needs to provide a mechanism for looping back probes, a mechanism for extracting the color of each probe, and a timer for determining whether the tunnel is providing connectivity from the active device to the passive device. If the color (or type) of each probe can be extracted without control processing (e.g., if this information can be obtained by data plane processing implemented at the tunnel port on the passive node), the amount of control plane processing needed to detect tunnel availability at the passive device can be greatly reduced.

Accordingly, the use of the multi-colored probes described herein can provide several potential advantages. First, the amount of control traffic (e.g., the amount of probes generated by devices coupled by the tunnel) is reduced, since only one device sends probes. Second, the control plane of the passive device does not need to be involved in probe processing (instead, the data plane of the passive device can process probes). This reduces the likelihood that the performance of the passive device will be degraded in environments where the passive device acts as a hub that terminates several hundred or even thousand tunnels.

Depending upon the network topology, tunnel endpoints can be configured as active or passive devices in a manner that reduces the control plane processing required for tunnel availability detection at any given network device. For example, in a star VPN topology, all the spokes would be active and the hub would just act as a passive device. In contrast, in a mesh VPN topology, a given network device can be configured as the passive device for half of the tunnels via which that network device communicates and the active device for the remaining tunnels via which that network device communicates. Accordingly, the control plane processing needed to detect tunnel availability can be spread approximately evenly around the network.

The probes have as much (or little) impact on the passive device as regular data traffic, since there is no need for the passive device to perform control processing on the probe or to generate a probe response. Probes also have the same jitter and delay as the data traffic being conveyed via the tunnel.

The packet format of the probes can vary depending upon what type of protocol is being used to convey the probes. For example, if the probes are IP packets, a special IP protocol type can be used for red probes and another protocol type can be used for Green. If probes are IPv6 packets, two different link-layer addresses can be used to identify the type of probe: one for red probes and one for green probes. If the passive device's port hardware allows upper layer inspection beyond the IP header, UDP can be used to convey the probe and port numbers can be used to identify the color of the packet (e.g., each probe color can have its own destination port). In general, any portion of the probe that is available for inspection via the receiving port in the passive device (e.g., using a TCAM implemented at that port) can store a value that identifies whether the probe is a red probe or a green probe. In one embodiment, the probes can be directly implemented within the tunnel headers themselves (e.g., two bits within a GRE flags header can be used to identify the color, or type, of probe).

In one embodiment, GRE keepalive packets are used as probes. Before transmission via the tunnel, the GRE packets are encapsulated with an IP header (e.g., having it source address be the address of the active device and its destination address be the address of the passive device). The IP header is removed from the packet by the receiving passive device. At this point, the passive device can determine the type or color of the probe by parsing the GRE packet header. When the packet is being looped back, the passive device reencapsulates the GRE packet with a new IP header (e.g., having its source address be the address of the passive device and its destination address be the address of the active device) and sends the encapsulated packet to the active device.

It is noted that, within the passive device (or both the active and passive device), both probes and idle timers are used to determine tunnel availability. For example, the passive device can determine that the tunnel is unavailable in response to either receiving a red probe or in response to changes in an idle timer (e.g., if a countdown timer has expired or if a counter has ceased incrementing) indicating that no probes have been received recently. Similarly, the active device can determine that the tunnel is unavailable in response to changes in an idle timer associated with the tunnel. In the passive device, the mechanism for monitoring the idle timers can be implemented in the control plane in at least some embodiments.

In one embodiment, idle timers (one per tunnel configured on a device) are implemented as a linked list of sessions, wherein each session is represented by an idle timer element of the linked list. Each session is associated with a tunnel and the sessions are linked together (or daisy chained) in what is commonly called a doubly-linked list. The sessions are also stored in a fast-search data structure, such as a tree. Each time the device receives a probe associated with a particular tunnel, the device identifies the corresponding session for that tunnel from the fast-search data structure. The device then marks the session (by updating one or both of the fast-search data structure and the linked list) with a time stamp corresponding to the time the probe was received. Then, the device moves the newly-marked session to the top of the linked list. By consistently performing this series of operations, the sessions in the linked list will be sorted, such that more recently updated idle timers will be located at the top of the linked list, while the less recently updated idle timers will be at the end of the linked list.

Regularly (e.g., periodically or in response to predetermined stimuli), the device inspects the end of the linked list. If the last session (the session identified in the end of the linked list) has not expired (e.g., if the time stamp associated with that session was generated less than a prespecified amount of time ago, relative to the current time), the device can detect that the rest of the sessions in the linked list, which have been updated more recently, cannot have expired either. If the last session has expired, the list is traversed until an unexpired session is found. The device can then detect that all of tunnels associated with the expired sessions are unavailable. The device can then move these expired sessions to another list where each can be monitored (e.g., so that a session structure can be moved back to the original linked list when a green probe finally arrives in the associated tunnel).

While the above descriptions describes an embodiment in which more recently updated idle timers are located at the top of the list, other embodiments can be implemented differently. For example, more recently updated idle timers can be moved to the end of the linked list instead of the top in alternative embodiments.

In one embodiment, the passive device implements a process that uses timer wheels to monitor the idle timer(s) maintained by the passive device. This process can be event triggered (e.g., whenever an idle timer value reaches a value that indicates that the associated tunnel is unavailable (e.g., when the timestamp in a linked list session structure for a given tunnel identifies a time older than a prespecified amount of time before the current time, the process is triggered) or periodic. The process examines the data structure (e.g., a linked list) implementing the idle timers to identify the unavailable tunnels.

Other embodiments can also use other techniques to rapidly identify unavailable tunnels. For example, the multiple session technique described above can be replaced or supplemented with a single idle timer that is always updated to identify the remaining lifetime of the oldest unexpired session (and thus the tunnel in most danger of being identified as being unavailable).

In alternative embodiments, idle timers (one per tunnel configured on a device) are implemented as counters. Each counter is associated with information that identifies the tunnel with which that counter is associated. Each counter can increment automatically. If a probe associated with a particular tunnel is received, the counter associated with that tunnel is reset. The counters are maintained in a data structure in a memory device. The data structure is sorted by value (e.g., using a timer wheel), such that timers having a higher value will be at the top and timers having a lower value are at the bottom. Accordingly, any counters that identify an unavailable tunnel (e.g., as determined by the counter value exceeding a prespecified maximum value) will be at the top or beginning of the data structure (timers could also be sorted in the opposite manner, so that counters associated with unavailable tunnels appear at the bottom or end of the data structure).

It is noted that another embodiment can use countdown timers that are reset whenever a probe is received via the associated tunnel. In this embodiment, timers having a zero or negative value (if negative values are allowed) identify unavailable tunnels. Here, times can be sorted such that timers having lower values appear at the top (timers could also be sorted in the opposite manner, so that counters associated with unavailable tunnels appear at the bottom or end of the data structure). Receipt of a new probe causes the timer to be moved to the end of the data structure furthest from the end that stores timers associated with unavailable tunnels.

Throughout this disclosure, the term "packet" is used to refer to a logical grouping of information sent as a data unit over a transmission medium. Packets may include header and/or trailer information that surrounds user data contained in the data unit. For purposes of this disclosure, a "packet" may include a cell, datagram, frame, message, segment, or any other logical group of information.

Figure 5:
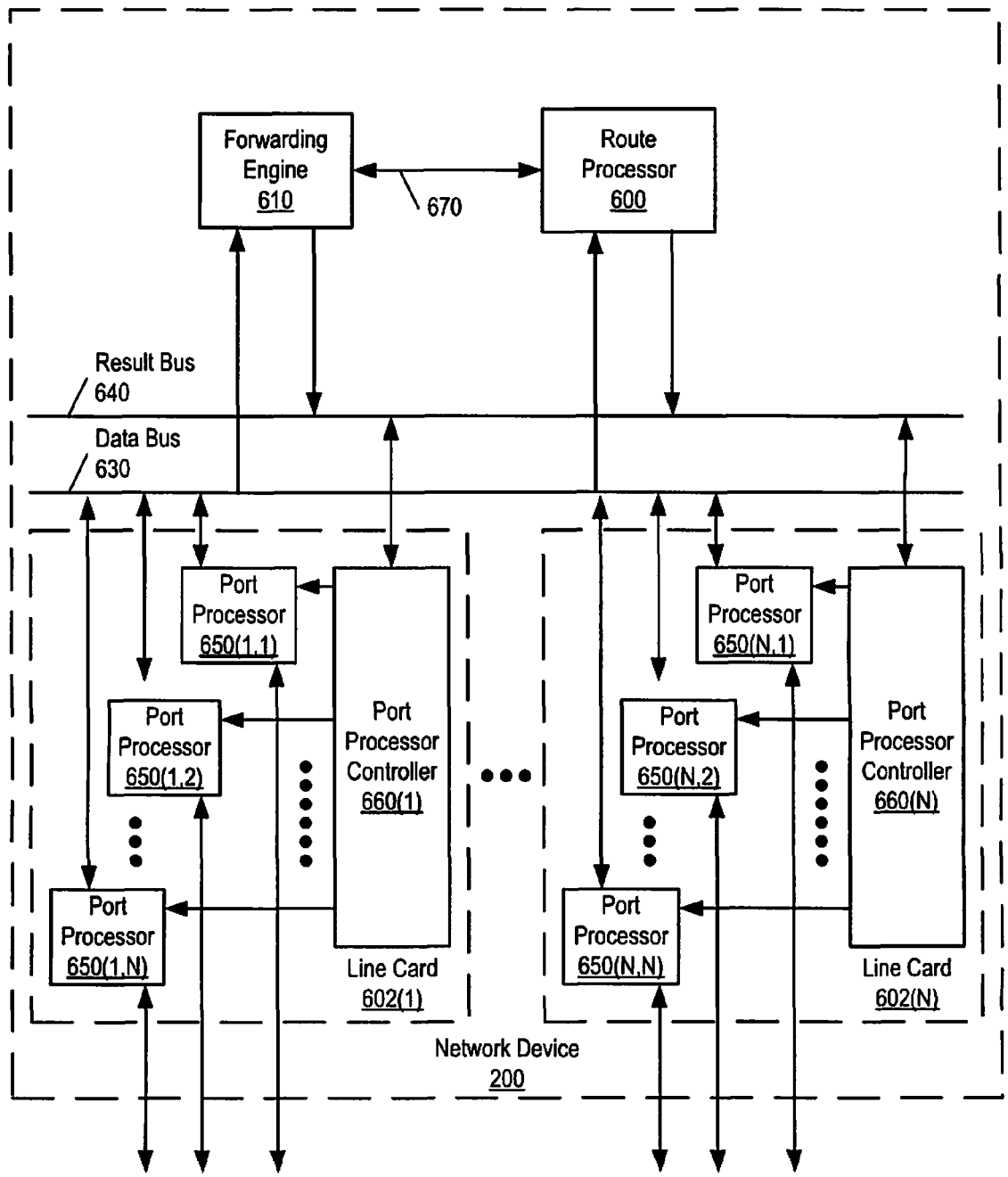
FIG. 5 shows a block diagram of a network device that supports a tunnel detection protocol, according to one embodiment of the present invention.

FIG. 5 shows a block diagram of a network device that supports a tunnel detection protocol. It is noted that this diagram is presented by way of example only; other embodiments may be implemented in a significantly different manner.

FIG. 5 is a block diagram of a network device 200 (e.g., one of network devices 100 or 110(1)-110(2) of FIGS. 1, and 2). In this depiction, network device 200 includes a number of line cards (line cards 602(1)-602(N)) that are communicatively coupled to a forwarding engine 610 and a route processor 600 via a data bus 630 and a result bus 640. Forwarding engine 610 includes forwarding engine functionality. In some embodiments, forwarding engine 610 and/or route processor 600 can each include a tunnel detection module (e.g., route processor 600 can be configured to implement the functionality of an active device, as well as some idle timer monitoring functionality in both active and passive devices (in at least some embodiments), and/or forwarding engine 610 can be configured to implement the functionality of a passive device).

Line cards 602(1)-602(N) include a number of port processors 650(1,1)-650(N,N) which are controlled by port processor controllers 660(1)-660(N). It will also be noted that control module 610 and route processor 600 are not only coupled to one another via data bus 630 and result bus 640, but are also communicatively coupled to one another by a communications link 670. It is noted that in alternative embodiments, each line card can include a forwarding engine (as opposed to having a centralized forwarding engine 610). In such alternative embodiments, all or part of a tunnel detection module (e.g., configured to implement the functionality of a passive device) can also be included on each line card. Additionally, all or part of the functionality of a tunnel detection protocol module (e.g., configured to implement the functionality of a passive device) can be implemented within a port processor controller (e.g., one of port processor controllers 660(1)-660(N)).

When a packet is received, the packet is identified and analyzed by a network device such as network device 200 in the following manner. Upon receipt, a packet (or some or all of its control information) is sent from the one of port processors 650(1,1)-650(N,N) at which the packet was received to one or more of those devices coupled to data bus 630 (e.g., others of port processors 650(1,1)-650(N,N), forwarding engine 610 and/or route processor 600). Handling of the packet can be determined, for example, by forwarding engine 610. For example, forwarding engine 610 may determine that the packet should be forwarded to one or more of port processors 650(1,1)-650(N,N). This can be accomplished by indicating to corresponding one(s) of port processor controllers 660(1)-660(N) that the copy of the packet held in the given one(s) of port processors 650(1,1)-650(N,N) should be forwarded to the appropriate one of port processors 650(1,1)-650(N,N).

Figure 6:
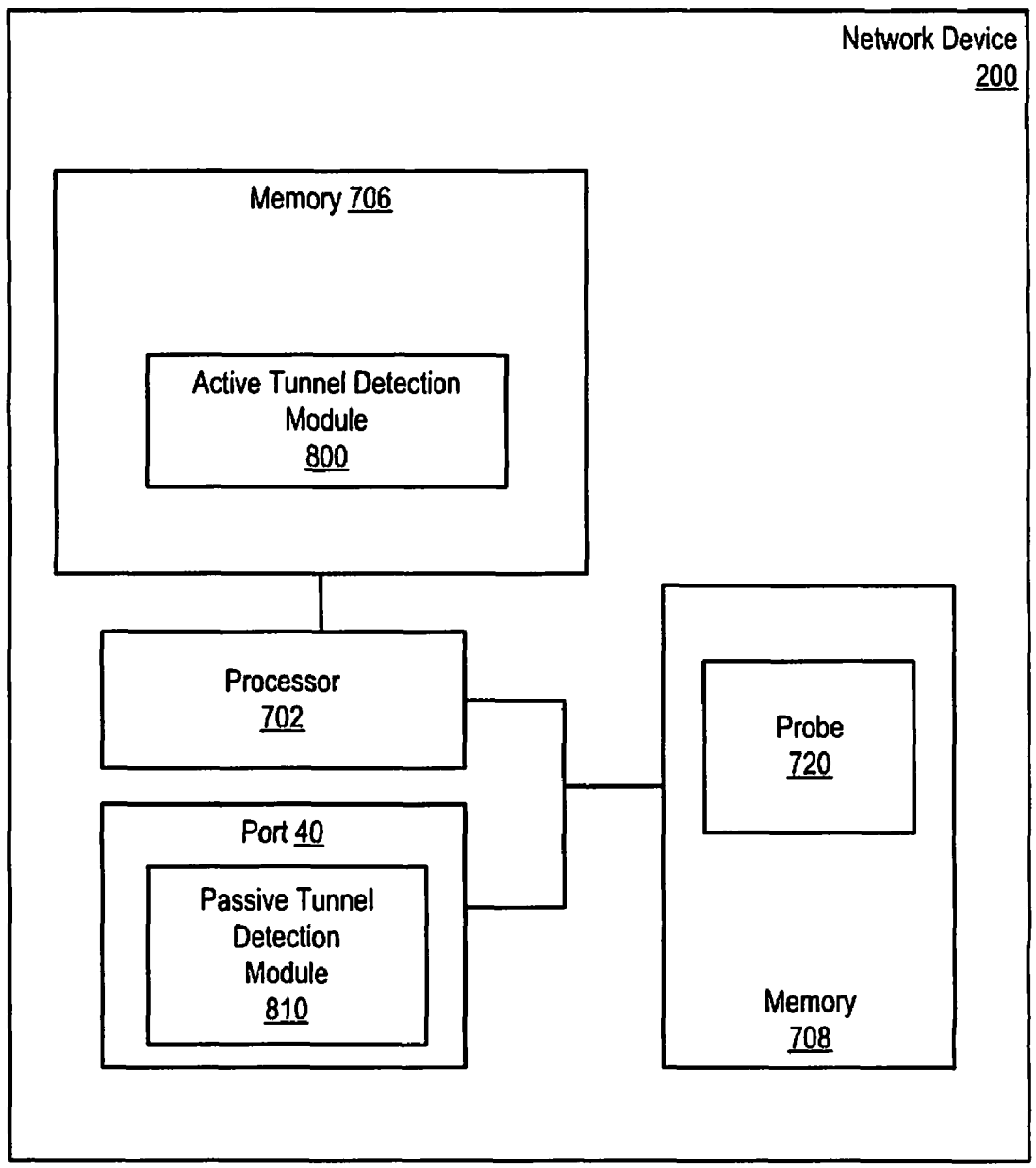
FIG. 6 is another block diagram of a network device that implements a tunnel detection module, according to one embodiment of the present invention.

FIG. 6 is a block diagram of a network device 200 (e.g., as shown in FIG. 6), which illustrates how tunnel detection modules can be implemented in software and hardware within a network device. As illustrated, network device 200 includes one or more processors 702 (e.g., microprocessors, PLDs (Programmable Logic Devices), or ASICs (Application Specific Integrated Circuits)) configured to execute program instructions stored in memory 706. These program instructions include instructions executable to implement an active tunnel detection module 800, which implements the functionality of the active device described above. Memory 706 can include various types of RAM (Random Access Memory), ROM (Read Only Memory), Flash memory, MEMS (Micro Electro-Mechanical Systems) memory, and the like. Processor 702 and memory 706 can be included in a port processor (e.g., port processors 650(1,1)-650(N,N) of FIG. 5), a port processor controller (e.g., port processor controllers 660(1)-660(N) of FIG. 5), a control module or forwarding engine (e.g., forwarding engine 610 of FIG. 5), or a route processor (e.g., route processor 600 of FIG. 5). Processor 702, port 40, and memory 706 are coupled to send and receive data and control signals by a bus or other interconnect.

Network device 200 also includes a port 40. In response to receiving a probe 720, port 40 can store a copy of the probe in memory 708. If network device 200 acts as the active device for the tunnel with which the probe is associated, the receiving port can also notify active tunnel detection module 800 that a probe has been received (e.g., by generating an interrupt to processor 702). The active tunnel detection module 800 can then process the probe.

If network device 200 acts as the passive device for the tunnel with which the probe is associated, a passive tunnel detection module 810 (e.g., implementing using a TCAM) within the receiving port 40 can determine the availability of the tunnel based upon the color type of the probe and cause port 40 to resend the probe to the active device. Idle timer monitoring can be implemented by either passive tunnel detection module 810 or by control plane functionality (e.g., implemented by software stored in memory 706 and executed by processor 702).

In this example, program instructions executable to implement an active tunnel detection module 800 are stored in memory 706. The program instructions and data implementing the active tunnel detection module 800 can be stored on various computer readable media such as memory 706. In some embodiments, such software is stored on a computer readable medium such as a CD (Compact Disc), DVD (Digital Versatile Disc), hard disk, optical disk, tape device, floppy disk, and the like). In order to be executed by processor 702, the instructions and data are loaded into memory 706 from the other computer readable medium. The instructions and/or data can also be transferred to network device 200 for storage in memory 706 via a network such as the Internet or upon a carrier medium such as a network and/or a wireless link upon which signals such as electrical, electromagnetic, or digital signals, on which the data and instructions are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a probe packet from a sending device via a tunnel, wherein the receiving is performed by a receiving device and indicates that the tunnel is available to convey packets from the sending device to the receiving device;
detecting whether the tunnel is available to convey packets from the receiving device to the sending device, based upon information within the probe packet; and
forwarding the probe packet from the receiving device to the sending device via the tunnel.

2. The method of claim 1, further comprising:
maintaining an idle timer corresponding to the tunnel; and
detecting whether the tunnel is available to convey packets from the sending device to the receiving device, based upon a value associated with the idle timer.

3. The method of claim 2, further comprising:
updating the idle timer in response to receiving the probe packet.

4. The method of claim 2, further comprising:
maintaining a plurality of idle timers, wherein each idle timer corresponds to a respective one of a plurality of tunnels; and
sorting the plurality of idle timers, based upon how recently respective probe packets have been received via the tunnels.

5. The method of claim 4, further comprising:
accessing a least recently updated idle timer of the idle timers; and
determining whether a first tunnel associated with a more recently updated idle timer of the idle timers is available, based upon a value of the least recently updated idle timer.

6. The method of claim 5, further comprising performing the accessing and the determining periodically.

7. The method of claim 1, wherein the detecting is performed in a data plane of the recipient device.

8. A method comprising:
sending a probe packet from a sending device to a receiving device via a tunnel, wherein the receiving device is not configured to initiate sending of probe packets to the sending device via the tunnel, and wherein the probe packet comprises information indicating whether the tunnel is available to convey packets from the receiving device to the sending device; and
detecting whether the tunnel is available to convey packets from the receiving device to the sending device, based upon whether the probe packet is forwarded back to the sending device by the receiving device.

9. The method of claim 8, further comprising:
maintaining an idle timer corresponding to the tunnel; and
detecting whether the tunnel is available to convey packets from the receiving device to the sending device, based upon a value of the idle timer.

10. A system comprising:
a network device comprising an interface coupled to a passive tunnel detection module,
wherein the interface is configured to receive a probe packet from a sending device via a tunnel, wherein the receiving indicates that the tunnel is available to convey packets from the sending device to the network device,
wherein the passive tunnel detection module is configured to detect whether the tunnel is available to convey packets from the network device to the sending device, based upon information within the probe packet; and
wherein the passive tunnel detection module is configured to forward the probe packet from the network device to the sending device via the tunnel.

11. The system of claim 10, wherein the passive tunnel detection module is further configured to:
maintain an idle timer corresponding to the tunnel; and
detect whether the tunnel is available to convey packets from the sending device to the network device, based upon a value associated with the idle timer.

12. The system of claim 11, wherein the passive tunnel detection module is further configured to:
maintain a plurality of idle timers, wherein each idle timer corresponds to a respective one of a plurality of tunnels; and
sort the plurality of idle timers, based upon how recently respective probe packets have been received at the network device via the tunnels.

13. The system of claim 12, wherein the network device is further configured to:
access a least recently updated idle timer of the idle timers; and determine whether a first tunnel associated with a more recently updated idle timer of the idle timers is available, based upon a value of the least recently updated idle timer.

14. The system of claim 13, wherein the network device is further configured to access the least recently updated idle timer periodically.

15. The system of claim 10, wherein the network device further comprises a forwarding engine and a route processor, and wherein the forwarding engine comprises the passive tunnel detection module.

16. A system comprising:
a network device comprising an interface coupled to an active device tunnel detection module,
  wherein the interface is configured to send a probe packet from the network device to a receiving device via a tunnel,
  wherein the receiving device is not configured to initiate sending of probe packets to the network device via the tunnel, and
  wherein the probe packet comprises information indicating whether the tunnel is available to send packets from the receiving device to the network device; and
  wherein the active device tunnel detection module is configured to detect whether the tunnel is available to convey packets from the receiving device to the network device, based upon whether the probe packet is forwarded back to the network device by the receiving device.

17. The method of claim 16, further comprising:
maintaining an idle timer corresponding to the tunnel; and
detecting whether the tunnel is available to convey packets from the receiving device to the sending device, based upon a value of the idle timer.

18. A system comprising:
means for receiving a probe packet from a sending device via a tunnel, wherein the receiving indicates that the tunnel is available to convey packets from the sending device to a receiving device;
means for detecting whether the tunnel is available to convey packets from the receiving device to the sending device, based upon information within the probe packet; and
means for forwarding the probe packet from the receiving device to the sending device via the tunnel.

19. A system comprising:
means for sending a probe packet from a sending device to a receiving device via a tunnel, wherein the receiving device is not configured to initiate sending of probe packets to the sending device via the tunnel, and wherein the probe packet comprises information indicating whether the tunnel is available to convey packets from the receiving device to the sending device; and
means for detecting whether the tunnel is available to convey packets from the receiving device to the sending device, based upon whether the probe packet is forwarded back to the sending device by the receiving device.

* * * * *